May 12, 1942.  H. J. MURPHY  2,283,122

NUT DEVICE

Filed April 9, 1940

Inventor:
Howard J. Murphy,
by John Jodd
Att'y.

Patented May 12, 1942

2,283,122

UNITED STATES PATENT OFFICE 2,283,122

NUT DEVICE

Howard J. Murphy, Greenwood, Mass., assignor to United-Carr Fastener Corporation, Cambridge, Mass., a corporation of Massachusetts Application April 9, 1940, Serial No. 328,723

5 Claims. (Cl. 85—32)

This invention relates to improvements in nut devices of the type adapted to be snapped into assembly with a supporting panel through an opening from a position on one side only of the panel.

Referring to the drawing, in which I have illustrated a preferred embodiment of my invention:

Figure 1:
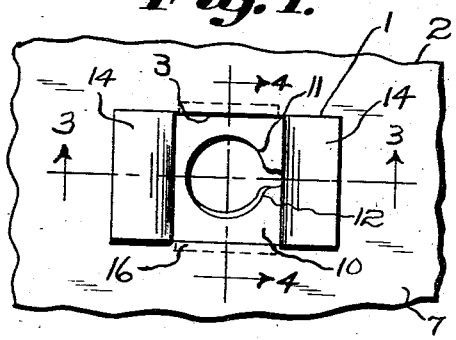
Fig. 1 is a top plan view of a supporting panel with one of my improved nut members assembled therewith.
Figure 2:
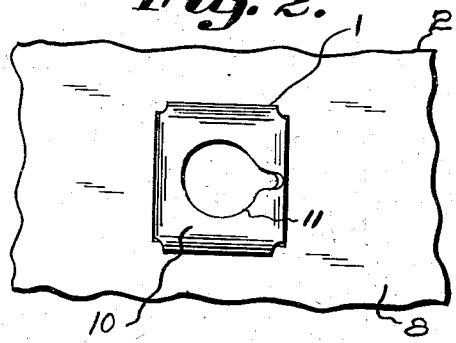
Fig. 2 is a bottom plan view of the installation shown in Fig. 1.
Figure 3:
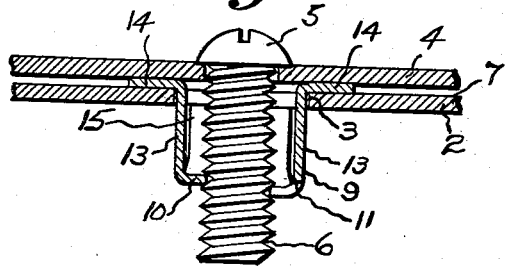
Fig. 3 is a sectional view taken along the line 3—3 of Fig. 1 and showing a plate member secured in superposed relation to the supporting panel.
Figure 4:
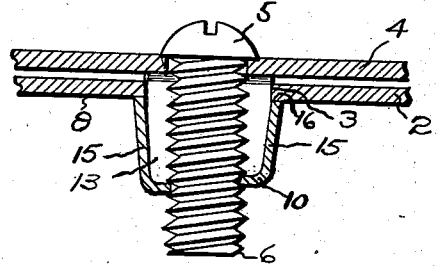
Fig. 4 is a section taken along the line 4—4 of Fig. 1 and showing a plate member secured to the supporting panel.
Figure 5:
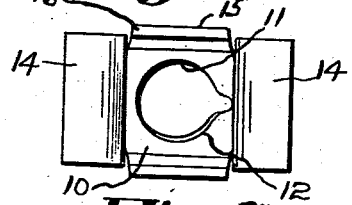
Fig. 5 is a top plan view of my improved nut member per se.
Figure 6:
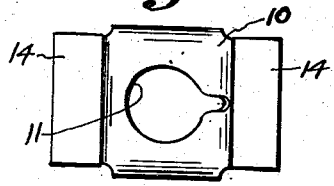
Fig. 6 is a bottom plan view of my improved nut member per se.
Figure 7:
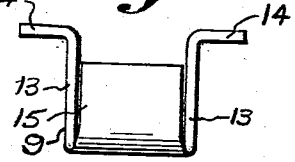
Fig. 7 is a side elevation of my improved nut member per se.
Figure 8:
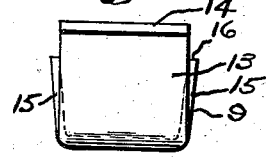
Fig. 8 is a view of the nut member turned 90° from its position in Fig. 7.

Referring in detail to my preferred nut installation illustrated in Figs. 1-4, I have shown a nut member 1 in snap fastener engagement with a supporting panel 2 through an opening 3. The opening 3 is preferably rectangular in shape so as to cooperate with the nut member in a manner to be described. A part such as a plate member 4 is secured in superposed relation to the panel 2 by a screw or bolt (Figs. 3 and 4) having a head 5 engaging the plate 4 and a threaded shank 6 extending through the plate 4 of the opening 3 of the support into threaded engagement with the nut device. The nut member, as hereinafter more fully described, includes portions engaging the upper surface 7 of the support 2, a base portion having bolt-engaging means insertable through the opening 3 and yieldable attaching portions adapted to be snapped through the opening 3 to engage behind the lower surface 8 of the supporting panel to secure the nut member to the panel.

Referring in detail to my first form of improved nut member, I have shown one made entirely from one piece of sheet metal and having a substantially rectangular box-like body portion 9. The body portion 9 preferably comprises a rectangular base 10 having a smaller area than the opening 3 so as to be movable through the opening. The base has an opening 11 for receiving a threaded member. The metal surrounding the opening 11 is shaped to form a helical wall 12 conforming to the pitch of the threaded member so as to coact with the same. The box-like portion 9 has four walls in upstanding relation to the base 10 and separated at their side edges. The walls comprise a pair of oppositely disposed leg portions 13—13 integrally joined to opposite edges of the base 10. Each of the legs 13 has a width which is substantially equal to that of the base edge to which it is joined. Outwardly extending portions 14—14 are provided at the ends of the legs 13—13 away from the base 10 for engagement with the upper surface 7 of the panel 2 to limit movement of the nut member through the opening 3. The other set of oppositely disposed walls are in the form of attaching portions 15—15, which, in my preferred construction, are integrally joined to opposed side edges of the base 10 between the legs 13—13 and which have free edges 16 at their outer ends facing away from the base 10 and adapted to act as shoulder means for engagement behind the lower surface 8 of the supporting panel 2. It will be noticed that the normal distance between the legs 13—13 is less than the length of the corresponding axis of the opening 3 while the distance between the attaching portions 15—15 is normally greater than the length of the other axis of the opening 3.

Assembly of my nut device with the supporting panel is carried out by moving the body portion 9 of the nut device through the opening 3 of the support until the outwardly extending portions 15—15 engage the surface 7 of the support. During this action the attaching portions 15—15 engage the walls of the opening 3 and are contracted thereby until the edges 16—16 have passed through the aperture 3, at which time the attaching portions expand, as a result of the resiliency of the metal, to engage the shoulders 16 behind the lower surface 8 of the panel. The nut member is now secured in attachment to the panel and fixed against movement relative to the panel during tightening of the screw.

Thus by my invention I have provided an inexpensive nut device easily attachable to a supporting panel from one side of the panel.

Although I have illustrated and described a preferred embodiment of my invention, I do not wish to be limited thereby because the scope of my invention is best defined by the following claims.

I claim:

1. A one-piece nut device having a base, said base having integral bolt-engaging means, leg portions extending from said base in angular relation to the plane thereof and having means for engaging one side of a support, and yieldable attaching portions extending from said base having means for engaging an opposite side of said support, said attaching portions constructed and arranged for snapping through an aperture in a support on movement of said base through said aperture to hold the nut in place prior to a bolt being engaged therewith.

2. A nut device having a base, said base having thread-engaging means for cooperative engagement with a bolt to be extended through said base, leg portions extending from said base in angular relation to the plane thereof having laterally extending means at their outermost ends for engaging one side of a support, and attaching portions extending from said base intermediate said leg portions and having their outermost free edges adapted to engage an opposite side of said support, said attaching portions being yieldable so as to pass through an aperture in a support and then expand whereby said free edges hold the nut in place prior to a bolt being engaged therewith.

3. A nut device having a base, said base having thread-engaging means for cooperative engagement with a bolt to be extended through said base, a pair of oppositely disposed leg portions extending from side edges of said base out of the plane of said base, said leg portions having laterally extending means at their outermost ends for engaging one side of a support, and opposed yieldable attaching portions extending from the side edges of said base intermediate said leg portions, said attaching portions having shoulder means for engaging an opposite side of said support, said attaching portions being contractible and expansible so as to snap through an aperture in a support whereby said shoulders hold the nut in place prior to a bolt being engaged therewith.

4. A nut device having a rectangular base, said base having thread-engaging means for cooperative engagement with a bolt to be extended through said base, a pair of oppositely disposed leg portions extending from the edges of said base at opposed sides thereof, said leg portions extending out of the plane of said base and having laterally extending means at the outermost ends for engaging one side of a support, and opposed attaching portions extending from side edges of said base intermediate said leg portions, said attaching portions being yieldable and having shoulder means normally disposed laterally beyond the marginal limits of said base for engaging an opposite side of said support, said attaching portions adapted to be snapped through an aperture in a support and hold the nut in place prior to a bolt being engaged therewith.

5. A nut device having a substantially rectangular box-like body portion comprising a base having thread-engaging means for cooperative engagement with a bolt to be extended through said base and side walls extending upwardly from said base, said side walls being separated at their side edges, a pair of oppositely disposed side walls having laterally extending means at their outer ends for engaging the upper side of a supporting panel, and the other pair of oppositely disposed side walls having shoulder means disposed laterally beyond the marginal limits of said base, and said last-mentioned side walls being yieldable to contract during insertion of said box-like body, through an aperture of said supporting panel and then expand to move said shoulder means behind the lower side of said panel.

HOWARD J. MURPHY.